US010671872B2

(12) United States Patent
Voros et al.

(10) Patent No.: US 10,671,872 B2
(45) Date of Patent: Jun. 2, 2020

(54) DEVICE AND METHOD FOR AUTOMATICALLY DETECTING A SURGICAL TOOL ON AN IMAGE PROVIDED BY A MEDICAL IMAGING SYSTEM (71) Applicants: UNIVERSITE GRENOBLE ALPES, Saint Martin d'Heres (FR); INSTITUT NATIONAL DE LA SANTE ET DE LA RECHERCHE MEDICALE, Paris (FR); CENTRE NATIONAL DE LA RECHERCHE SCIENTIFIQUE, Paris (FR)

(72) Inventors: Sandrine Voros, Grenoble (FR); Anthony Agustinos, Saint Martin d'Heres (FR); Arnold Fertin, Grenoble (FR)

(73) Assignees: UNIVERSITE GRENOBLE ALPES, Saint Martin d'Heres (FR); INSTITUT NATIONAL DE LA SANTE ET DE LA RECHERCHE MEDICALE, Paris (FR); CEN'TRE NATIONAL DE LA RECHERCHE SCIENTIFIQUE, Paris (FR)

( * ) Notice: Subject to any disclaimer, the term of this patent is extended or adjusted under 35 U.S.C. 154(b) by 210 days.

(21) Appl. No.: 15/750,199

(22) PCT Filed: Aug. 2, 2016

(86) PCT No.: PCT/FR2016/052018
§ 371 (c)(1),
(2) Date: Feb. 4, 2018

(87) PCT Pub. No.: WO2017/021654
PCT Pub. Date: Feb. 9, 2017

(65) Prior Publication Data
US 2018/0225538 A1 Aug. 9, 2018

(30) Foreign Application Priority Data

Aug. 4, 2015 (FR) .................................... 15 57508

(51) Int. Cl.
G06K 9/00 (2006.01)
G06K 9/32 (2006.01)
(Continued)

(52) U.S. Cl.
CPC ....... *G06K 9/3241* (2013.01); *G06K 9/00201* (2013.01); *G06K 9/3233* (2013.01);
(Continued)

(58) Field of Classification Search
CPC ......... G06K 2209/057; G06K 9/00201; G06K 9/3233; G06K 9/3241; G06K 9/4604;
(Continued)

(56) References Cited

U.S. PATENT DOCUMENTS 8,391,571 B2 * 3/2013 Cinquin ............. G06K 9/00201
382/128
9,111,355 B1 * 8/2015 Honda ..................... G06T 5/008
(Continued)

OTHER PUBLICATIONS

Fernandes, Leandro AF, and Manuel M. Oliveira. "Real-time line detection through an improved Hough transform voting scheme." Pattern recognition 41.1 (2008): 299-314. (Year: 2008).*
(Continued)

*Primary Examiner* — Li Liu
(74) *Attorney, Agent, or Firm* — Moreno IP Law LLC (57) ABSTRACT The invention concerns a method for detecting a surgical tool on a first image comprising the following steps: storing shape parameters of the surgical tool; determining a second image ($I_3$) containing distinct pixel regions from the first image by means of a first processing operation comprising the segmentation of the first image; determining first windows (F), each first window surrounding one of the regions;

(Continued)

selecting at least one second window from among the first windows, from the shape parameters; determining a third image from the first image by applying, to the first image, a second processing operation implementing Frangi's algorithm; and determining lateral edges of the surgical tool on the part of the third image contained in said second window.

12 Claims, 6 Drawing Sheets

(51) Int. Cl.
  *G06K 9/46* (2006.01)
  *G06K 9/62* (2006.01)
(52) U.S. Cl.
  CPC ........... *G06K 9/4604* (2013.01); *G06K 9/623* (2013.01); *G06K 2209/057* (2013.01)
(58) Field of Classification Search
  CPC .................................................. G06K 9/623; A61B 34/20; A61B 2034/2065; A61B 90/37; G06T 2207/30004; G06T 7/11
  See application file for complete search history.

(56) References Cited

U.S. PATENT DOCUMENTS

| | | | | |
|---|---|---|---|---|
| 9,547,940 | B1* | 1/2017 | Sun | G06T 19/006 |
| 2014/0328517 | A1* | 11/2014 | Gluncic | G06K 9/00 382/103 |
| 2015/0170381 | A1* | 6/2015 | Liu | H04N 5/23229 348/77 |
| 2016/0247276 | A1* | 8/2016 | Chou | A61B 90/37 |
| 2016/0314375 | A1* | 10/2016 | Lee | G06T 7/0014 |
| 2018/0158201 | A1* | 6/2018 | Thompson | G06T 7/344 |

OTHER PUBLICATIONS

Tonet, Oliver, et al. "Tracking endoscopic instruments without a localizer: a shape-analysis-based approach." Computer Aided Surgery 12.1 (2007): 35-42.*

Uhercík, Marián, et al. "Line filtering for surgical tool localization in 3D ultrasound images." Computers in biology and medicine 43.12 (2013): 2036-2045.*

Voros, Sandrine, Jean-Alexandre Long, and Philippe Cinquin. "Automatic detection of instruments in laparoscopic images: A first step towards high-level command of robotic endoscopic holders." The International Journal of Robotics Research 26.11-12 (2007): 1173-1190.*

PCT International Search Report; International Application No. PCT/FR2016/052018; dated Nov. 28, 2016, 2 pages.

Tonet, Oliver et al., "Tracking endoscopic instruments without a localizer: A shape-analysis based approach"; Computer Aided Surgery; 12:1; pp. 35-42; Jan. 2007.

Uhercik, Marian et al., "Line filtering for detection of microtools in 3D ultrasound data"; Computers in Biology an Medicine; vol. 43, No. 12; pp. 2036-2045; Dec. 2013.

Uhercik, Marian et al., "Line filtering for surgical tool localization in 3D ultrasound images"; 2009 IEEE Ultrasonics Symposium Proceedings; vol. 43, No. 12; pp. 594-597; Sep. 2009.

Translation of the Written Opinion of the International Searching Authority; International Application No. PCT/FR2016/052018; 7 pages.

* cited by examiner

DEVICE AND METHOD FOR AUTOMATICALLY DETECTING A SURGICAL TOOL ON AN IMAGE PROVIDED BY A MEDICAL IMAGING SYSTEM

CROSS-REFERENCE TO RELATED APPLICATION

The present patent application claims the priority benefit of French patent application FR15/57508 which is herein incorporated by reference.

FIELD

The present application relates to computer-assisted surgical operations where the surgeon performs the operation with the assistance of images supplied by a medical imaging system. The present invention more particularly relates to a device and a method of automatic detection of surgical tools in the images supplied by the medical imaging system.

BACKGROUND

During a coelioscopic surgical operation, a patient's abdominal cavity is inflated by means of carbon dioxide. Incisions of small dimensions are formed on the abdominal wall and a trocar is introduced into each incision. The number of incisions depends on the type of envisaged operation and generally varies from 2 to 5. Each trocar corresponds to a hollow and tight tube into which a surgical tool is capable of sliding. An endoscope and surgical tools are introduced into the abdominal cavity via the trocar. The image supplied by the endoscope is captured by a camera and displayed on a display screen. During the surgical operation, an assistant displaces the endoscope according to the instructions given by the surgeon. By means of the video image supplied by the camera connected to the endoscope, the surgeon manipulates the surgical tools in the abdominal cavity according to the operation to be performed.

An advantage of a coelioscopic surgical operation is that it causes little trauma to the patient since the incisions made have small dimensions. However, the surgeon does not directly see the ends of the surgical tools located in the abdominal cavity and can only use the video image provided by the camera connected to the endoscope to perform the operation. A coelioscopic surgical operation thus requires for the surgeon to be highly experienced.

Positioning systems may be used instead of an assistant to displace the endoscope. It is for example the system commercialized by Computer Motion under trade name Aesop, the system commercialized by Armstrong Healthcare under trade name EndoAssist, or the system commercialized by Intuitive Surgical under trade name da Vinci Surgical System.

U.S. Pat. No. 8,391,571 describes a method of determining the position of a surgical tool in video images. The endoscope of the positioning system can then be automatically controlled from determined positions of the surgical tools and, for example, from an initial order issued by the surgeon.

A disadvantage of the method described in U.S. Pat. No. 8,391,571 is that it requires previously determining the position of the incision point of the surgical tool. This may in particular be achieved by a feeler having its position located by a tracking device or by triangulation from two images supplied by the endoscope. This previous step may be complex to implement.

SUMMARY

The present application aims at overcoming all or part of the disadvantages of methods of automatic detection of surgical tools in images supplied by a medical imaging system.

Another object of an embodiment is to require no previous determination of the position of the incision of the surgical tool by a tracking device.

According to another object of the present invention, the detection of the surgical tools is performed in real time.

Thus, an embodiment provides a method of detecting a surgical tool in a first image, comprising the steps of:

storing shape parameters of the surgical tool;

determining a second image containing distinct pixel regions from the first image by a first processing comprising segmenting the first image;

determining first windows, each first window surrounding one of the regions;

selecting at least one second window from among the first windows based on the shape parameters;

determining a third image from the first image by applying to the first image a second processing implementing the Frangi algorithm; and determining lateral edges of the surgical tool on the portion of the third image contained in said second window.

According to an embodiment, the surgical tool has an elongated shape, the lateral edges of the surgical tool in the third image corresponding to straight lines.

According to an embodiment, candidate straight lines classified according to a ranking order are determined by applying a Hough transformation in the portion of the third image contained in the second window and the lateral edges are determined among the candidate lines based on shape parameters.

According to an embodiment, the second window is rectangular and divided into a first sub-window and a second sub-window, a first lateral edge corresponds to the candidate line having the best rank in the first sub-window and having an inclination with respect to the major axis of symmetry of the second window smaller than a first threshold and a second lateral edge corresponds to the candidate line having the best rank in the second sub-window, having an inclination with respect to the major axis of symmetry of the second window smaller than the first threshold and having its distance to the first lateral edge in the range from a second threshold to a third threshold which depend on the width of the second window.

According to an embodiment, the first processing comprises binarizing the first image and determining the second image based on the determination of the distance map of the binarized image.

According to an embodiment, the second processing comprises applying the Frangi algorithm to the first image with a search parameter, representative of the number of pixels of the apparent diameter of tubular structures searched for by the Frangi algorithm, smaller than 10 pixels.

According to an embodiment, the first image is an image in grey levels obtained from component 'a' or 'b' of a fourth image acquired by a camera and coded in the CIE Lab color space.

According to an embodiment, the first windows are rectangular and the second window is selected by only retaining the first windows having a length greater than half their width.

According to an embodiment, the first image is obtained from a fourth image acquired by a camera, the method further comprising the steps of:

determining projection planes containing the lateral edges and a projection center of the camera; and determining the position of a central axis of the surgical tool based on the intersection of the two projection planes, on the shape parameters, and on a point belonging to the central axis.

According to an embodiment, the method further comprises the steps of:

determining the projection of the central axis in the third image;

determining the pixels of the projection of the central axis belonging to the surgical tool; and determining the pixel of the projection of the central axis corresponding to the end of the tool.

According to an embodiment, the method comprises the steps of:

assigning to each pixel of the third image of the projection of the central axis a color class from among a first or a second color class;

selecting a first group of adjacent pixels containing the largest number of adjacent pixels of the first color class and a second group of adjacent pixels containing the largest number of adjacent pixels of the second color class; and selecting, from among the first or the second group of pixels, the pixel group belonging to the surgical tool.

Another embodiment provides a device for detecting a surgical tool in a first image, comprising:

means for storing shape parameters of the surgical tool;

means for determining a second image containing distinct pixel regions based on the first image by a first processing comprising segmenting the first image;

means for determining first windows, each window surrounding one of the regions;

means for selecting at least one second window from among the first windows based on the shape parameters;

means for determining a third image based on the first image by a second processing enhancing the contours of the surgical tool in the first image; and means for determining lateral edges of the surgical tool in the portion of the third image contained in said second window.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

The same elements have been designated with the same reference numerals in the different drawings. For clarity, only those elements which are useful to the understanding of the described embodiments have been shown and are detailed. Unless otherwise specified, expressions "approximately", "substantially", and "in the order of" mean to within 10%, preferably to within 5%.

Figure 1:
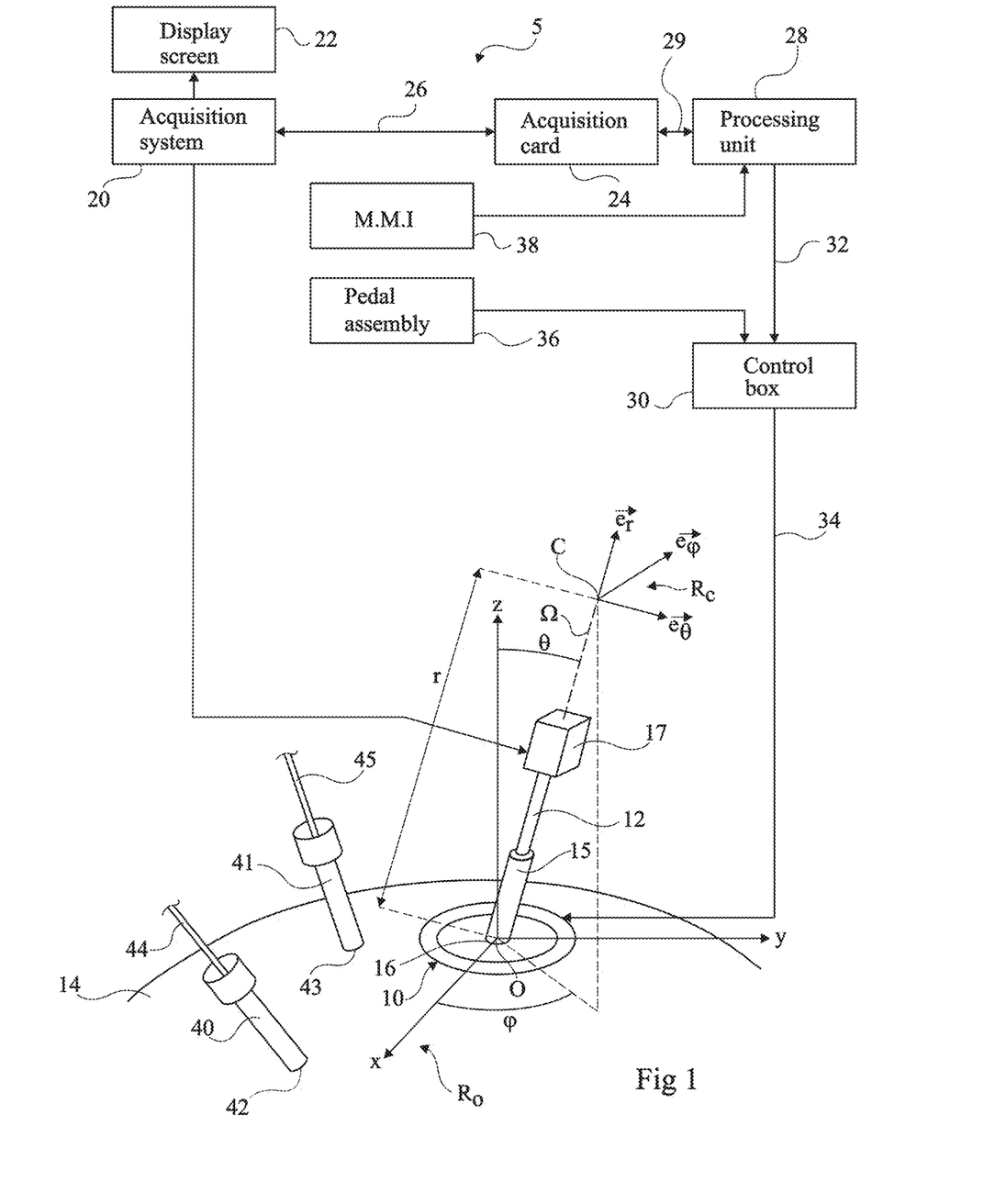
FIG. 1 schematically shows an embodiment of a device for controlling an endoscope positioning system implementing the surgical tool detection method.

FIG. 1 schematically shows an embodiment of a device 5 for controlling a system 10 for positioning an endoscope 12 implementing the surgical tool detection method according to the invention. For a coelioscopy, positioning system 10 is placed on the abdomen 14 of a patient having had its abdominal cavity filled with gas. Positioning system 10 holds a trocar 15 containing endoscope 12 and penetrating into the abdominal cavity via an incision 16. A camera 17 is affixed to the end of endoscope 12 outside of the abdominal cavity. Positioning system 10 is of the type allowing a displacement of trocar 15 and of endoscope 12 according to a number of degrees of freedom, for example, a degree of translational freedom and two degrees of rotational freedom. As a variation, the positioning system may directly hold endoscope 12, and displace trocar 15 via endoscope 12.

The images captured by camera 17 are transmitted to an image acquisition system 20 capable of displaying the video images on a display screen 22. Acquisition system 20 is connected to an acquisition card 24 via a connection 26, for example, a S-VIDEO cable, or a digital cable, for example, a HDMI cable or a USB cable. Acquisition card 24 is connected to a processing unit 28, via a connection 29, for example, a Fire-Wire cable (IEEE 1394 cable). As a variation, the acquisition card may be directly integrated to processing unit 28. Processing unit 28 may comprise a processor, a microprocessor, or a microcontroller capable of executing instructions of a computer program stored in a memory. Acquisition card 24 preprocesses the video images which are transmitted to processing unit 28. Processing unit 28 is capable, as explained in further detail hereafter, of analyzing the video images to detect the presence of surgical tools in the images.

Processing unit 28 is further capable of transmitting displacement orders to a control box 30 via a connection 32. Control box 30 is capable of translating the displacement orders transmitted over connection 32 into signals for controlling positioning system 10 and of transmitting the control signals to positioning system 10 via a connection 34. The surgeon can activate or deactivate control box 30 via a pedal assembly 36. Further, the surgeon can supply instructions to processing unit 28 via a man/machine interface 38 which may comprise a voice control system, a system for detecting the surgeon's head movements and/or a foot-operated system.

Positioning system 10 for example corresponds to the positioning system described in U.S. Pat. No. 8,591,397. Endoscope 12 may have the aspect of a cylindrical tube of axis Ω having a length of some forty centimeters and a diameter of a few centimeters. Axis Ω for example corresponds to the optical axis of endoscope 12 and of camera 17. Positioning system 10 is capable of modifying the inclination of trocar 15 relative to center O, that is, of modifying the inclination of axis Ω relative to the center O and of sliding endoscope 12 in trocar 15 along axis Ω. The previously-described positioning system 10 enables to displace endoscope 12 according to two degrees of rotational freedom and one degree of translational freedom based on control signals supplied by control box 30.

Additional trocars 40, 41 are arranged at the level of incisions 42, 43 of small dimensions made in the patient's abdominal wall 14. Additional trocars 40, 41 enable to introduce surgical tools 44, 45, partially shown in FIG. 2, into the abdominal cavity. As a variation, trocars 40, 41 may be omitted and surgical tools 44, 45 may be directly inserted through incisions 42, 43.

In the following description, call $R_O$ (O,x,y,z) a reference frame, for example, orthonormal, having its origin O for example corresponding to a "fixed point" of positioning system 10, for example, substantially the intersection between axis Ω and incision 16. Axes (Ox) and (Oy) correspond to two perpendicular axes perpendicular to axis (Oz), which is perpendicular to abdominal wall 14 at the level of incision 16. Reference frame $R_O$ is considered as being fixed with respect to the patient during the surgical operation. Camera 17 and endoscope 12 are, in operation, fixed with respect to each other. Call C a fixed point with respect to camera 17, located on axis Ω, at a distance r from point O. Angle θ corresponds to the angle between axis Ω and axis (Oz) and angle φ corresponds to the angle between the projection of axis Ω in plane (Oxy) and axis (Ox). The coordinates of point C in reference frame $R_O$ are (r sin θ cos φ, r sin θ sin φ, r cos θ). Call $R_C$ (C, $\vec{e}_r$, $\vec{e}_\theta$, $\vec{e}_\varphi$) the spherical reference frame associated with point C. Reference frame $R_C$ is fixed with respect to camera 17. Call (X, Y, Z) the coordinates of any point P expressed in reference frame $R_O$ and (l, m, n) the coordinates of point P expressed in reference frame $R_C$.

Figure 2:
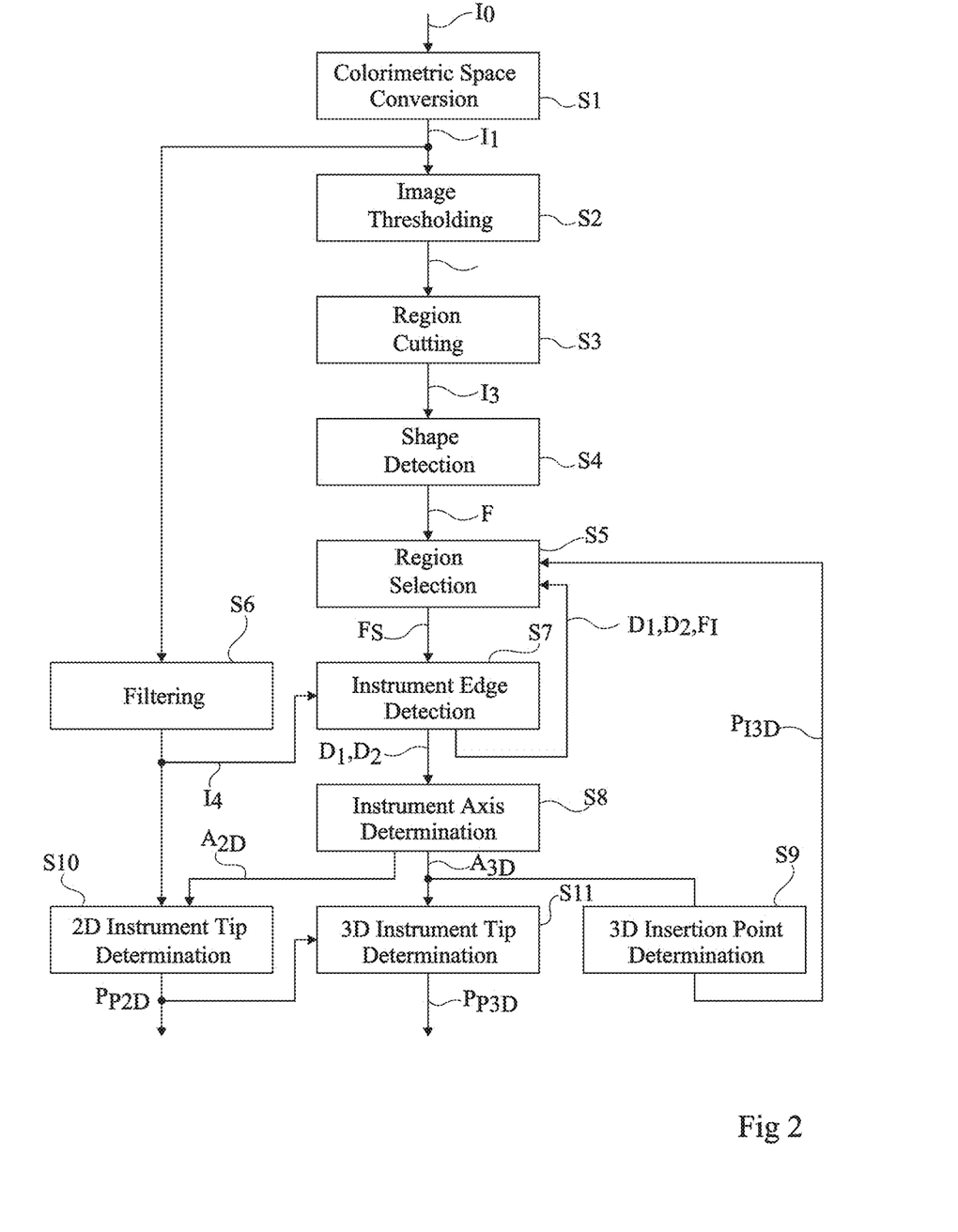
FIG. 2 illustrates, in the form of a block diagram, an embodiment of a surgical tool detection method.

FIG. 2 illustrates the steps of an embodiment of a method of detecting surgical tools in an image provided by camera 17 implemented by processing unit 28 and FIGS. 3 to 6 show images determined at certain steps of this detection method.

It is assumed that the surgeon has made incisions 16, 42, 43 in the patient's abdominal wall 14, has placed trocars 15, 40, 41 in the corresponding incisions, has introduced endoscope 12 into trocar 15 and has arranged positioning system 10 on the patient's abdominal wall 14. The method is implemented for each new image $I_0$ acquired by acquisition system 20 and transmitted to processing unit 28. Image $I_0$ forms in image plane PI of camera 17. Image $I_0$ is formed of a pixel array. A two-dimensional reference frame $R_{PI}$ (Q, $\vec{e}_u$, $\vec{e}_v$), where Q corresponds, for example, to the point of image plane PI on optical axis Ω and the coordinates of a pixel of the image in reference frame $R_{PI}$ are called (u, v), is associated with the plane of image PI.

At step S1, processing unit 28 carries out a processing of image $I_0$ to change the way in which the color data are coded for each pixel of the image. As an example, on acquisition of image $I_0$ by camera 17, the color data of each image pixel may be coded in the Red Green Blue or RVB color space. Processing unit 28 may determine a new image $I_1$ for which the color data of each pixel are stored in a color space adapted to human perception, for example, the HSV, CIE Lab, or CIE Luv color spaces. Preferably, processing unit 28 converts image $I_0$ into an image $I_1$ coded in a color space independent from the type of camera 7 used. Preferably, in the new color space, the image luminosity is coded separately from the specific color of the image. As an example, in the new color space, the new color data are preferably stored in the form of three components comprising a component which is representative of the pixel luminance and two components which are representative of the pixel chrominance. The components which are representative of chrominance are thus independent from the illumination of the scene. The method carries on at step 52.

Figure 3:
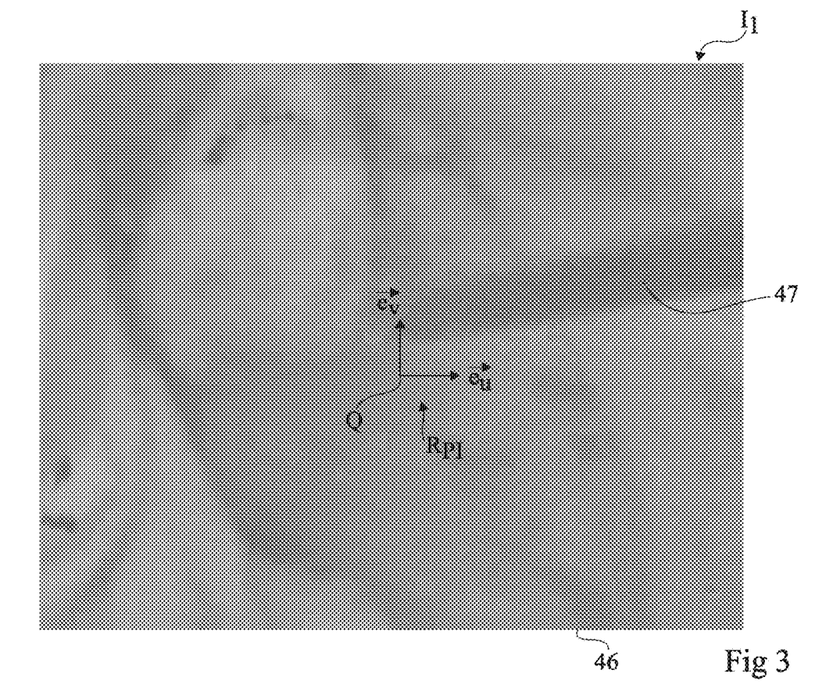
FIGS. 3 to 7 are examples of images determined at different steps on implementation of the embodiment of the surgical tool detection method illustrated in FIG. 2.

FIG. 3 shows, in grey levels, the component 'a' of an example of image $I_1$ in the CIE Lab color space. Full line 46 corresponds to the physical limit of image $I_1$. In image $I_1$ shown in FIG. 3, a grey area 47, darker than the rest of the image, which corresponds to a surgical tool, can be distinguished. FIG. 3 shows reference frame $R_{PI}$ (Q, $\vec{e}_u$, $\vec{e}_v$).

Figure 4:
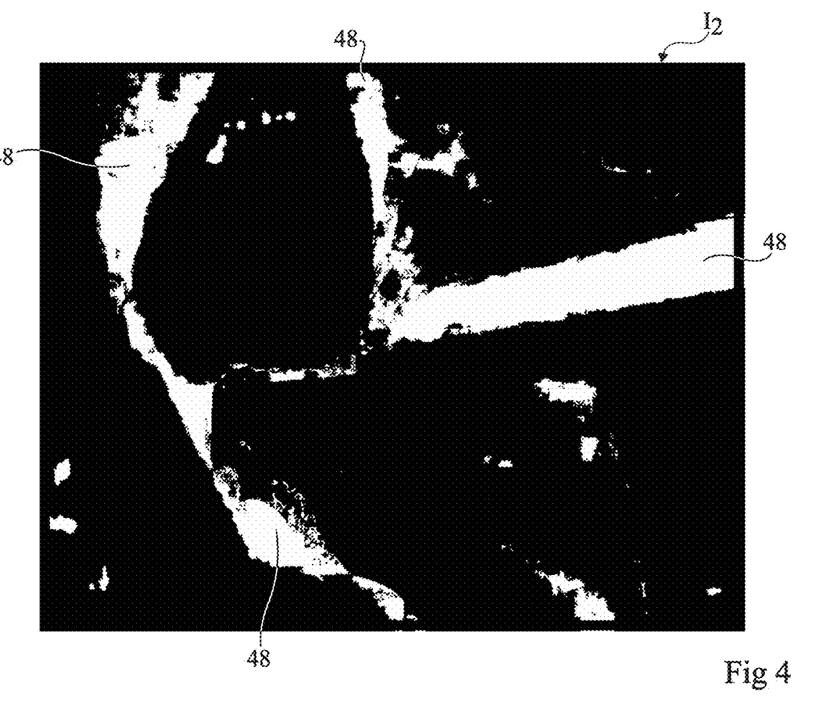

At step S2, processing unit 28 determines a new image $I_2$ by binarization of image $I_1$. According to an embodiment, only the components representative of the chrominance of image $I_1$ are used to perform the binarization, for example, components a and b of the CIE Lab color space or components u and v of the CIE Luv color space. According to another embodiment, only one of the components representative of the chrominance of image $I_1$ is used to perform the binarization. An example of a binarization method is Otsu's method. Otsu's method is for example described in the publication entitled "A threshold selection method from gray level histograms" of N. Otsu, IEEE Trans. Systems, Man and Cybernetics, Vol. 9, pp. 62-66, 1979. According to an embodiment, the binarization may be performed by determining, for all the pixels of image $I_1$, based on the components representative of chrominance, a histogram of a function H, representative of the pixel color, according to a number of levels, or color classes, which depends on the accuracy used for the coding of function H. A threshold is then defined according to Otsu's method. A first color class, for example, the lowest color class in the histogram, is then assigned to the pixels for which function H is smaller than the threshold, and a second color class, for example, the highest color class in the histogram, is assigned to the pixels for which function H is greater than the threshold. Image $I_2$ obtained after the binarization step comprises two pixels classes that can be represented by black pixels and white pixels. Surgical tools belong to the first pixel class while soft tissues belong to the second pixel class. As an example, the white color may be assigned to the pixels of the first class and the black color may be assigned to the pixels of the second class. The pixels of the first class form regions in image $I_2$ which may potentially correspond to surgical tools. Such regions are called potential regions hereafter. According to an embodiment, the threshold may be determined from the histogram of the selected color component of image $I_1$. A frame of pixels of the second class may be added around image $I_2$ to take into account the fact that the surgical tools generally extend all the way to the edges of image $I_1$ and to ease the determination, at a subsequent step, of contours of regions of pixels of the first class. FIG. 4 shows an example of image $I_2$ obtained from image $I_1$ of FIG. 3 after the implementation of steps S1 and S2. Image $I_2$ comprises a plurality of white regions 48, some of which are interconnected and only one of which corresponds to a surgical tool. As shown in FIG. 4, the obtained image $I_2$ is a very noisy image. The method carries on at step S3.

Figure 5:
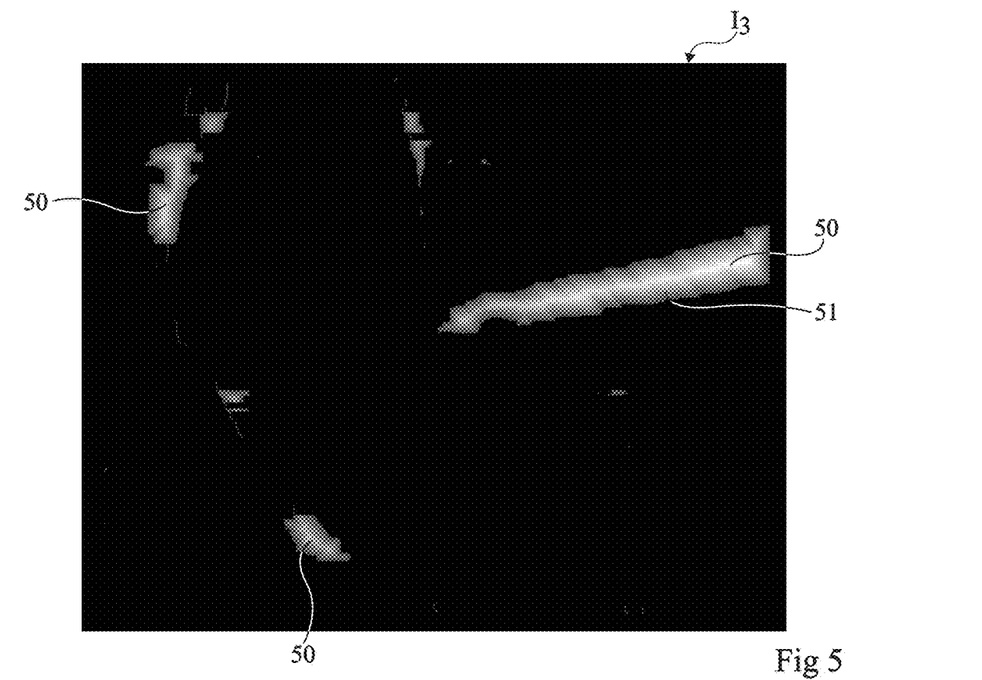

At step S3, unit 28 determines a new image $I_3$ by processing of image $I_2$ to suppress certain regions 48 of image $I_2$ having too small dimensions and which cannot correspond to a surgical tool and to isolate the regions 48 which might correspond to a surgical tool. The processing of image $I_2$ may comprise determining a distance map, also called distance transform, which associates with each pixel of image $I_2$ the distance to the closest obstacle point, and determining an image $I_3$ in grey levels based on the distance map. As an example, the obstacle points are the black pixels. The distance may correspond to the Euclidian distance, the Manhattan distance, or the Tchebychev distance. As an example, each pixel of image $I_3$ is assigned a grey level which is all the darker as the distance determined for the pixel is short, color black being assigned to the pixel when the distance is shorter than a threshold. FIG. 5 shows an example of an image $I_3$ obtained from image $I_2$ after the implementation of step S3. Image $I_3$ comprises regions 50 comprising white or grey level pixels which substantially correspond to regions 48 of image $I_2$ having large surface areas. In particular, regions 48 of small dimensions have disappeared, the corresponding pixels being kept black. Edge 51 of each region 50 of image $I_3$ comprises a continuous grey level transition from white to black. The method carries on at step S4.

Figure 6:
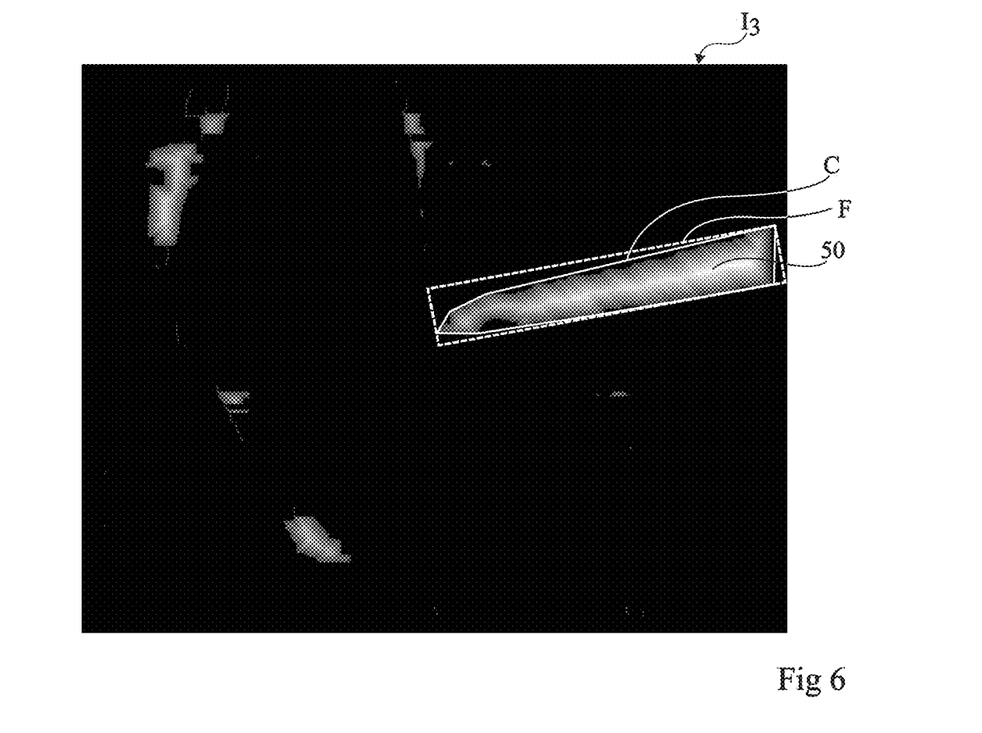

At step S4, unit 28 determines, for each region 50 of image $I_3$, the contour of region 50. The contour may be determined according to any type of contour determination algorithm, for example, the algorithm described in S. Suzuki and K. Abe's publication entitled "Topological structural analysis of digitized binary images by border following" (Computer Vision, Graphics, and Image Processing, 1985, vol. 30, no 1, p. 32-46). For the contour search, each pixel of region 50, which is in grey levels, can be considered as a white pixel. As an example, the contour of each region 51 may be searched for in the form of a broken line. Unit 28 determines, for each region 50 of image $I_3$, a window, for example, rectangular, having the minimum surface area and having its sides in contact with the contour of region 50. FIG. 6 shows, overlaid on image $I_3$, contour C and window F which are obtained at step S4 for the region 53 corresponding to a surgical tool. Given the digital processing operations implemented to obtain image $I_3$, contour C determined at step S4 does not generally accurately follow the real contour of the surgical tool in image $I_0$. It may however ease the determination of windows F, some of which at least contain surgical tools. For each window F thus determined, unit 28 determines and stores data relative to window F, for example, the position of the center of the window in image $I_3$, the width of window F, the length of window F, the area of the window and the orientation of the major axis of symmetry of window F. Unit 28 may perform a first selection from among the windows F thus determined by only keeping the windows which fulfill given criteria. These criteria are particularly defined according to the expected shape of the surgical tools in image $I_3$. An example of a criterion is that the ratio of the length to the width of window F should be greater than two, which corresponds to the fact that the surgical tool has an elongated shape. Another example of a criterion is for the area of window F to be greater than a threshold. This enables to exclude windows which are too small to correspond to the potential presence of an instrument. As an example, the minimum threshold for the area of the window may be 200 pixels. At the end of step S4, processing unit 28 has determined windows of interest F which may each contain a surgical tool. The method carries on at step S5.

At step S5, unit 28 may implement a second selection among the windows of interest F retained after the first selection. The second selection may be performed based on data resulting from the detection of the surgical tools in a previous image. It is possible for step S5 not to be implemented on acquisition of the initial images by acquisition system 20 and to only be implemented from the time when surgical tools are detected in the images supplied by acquisition system 20. According to an embodiment, these data may comprise the position of the point of insertion of the surgical tool in the image plane and/or the position of the edges of the surgical tool in the image plane which are determined at subsequent steps of the method described hereafter. A criterion may be for the major axis of symmetry of a window of interest F containing a surgical tool should run close to the point of insertion of the surgical tool. The windows of interest F kept at the end of step S5 are called selected windows $F_S$. According to another embodiment, step S5 may be omitted. The method carries on at step S7.

Figure 7:
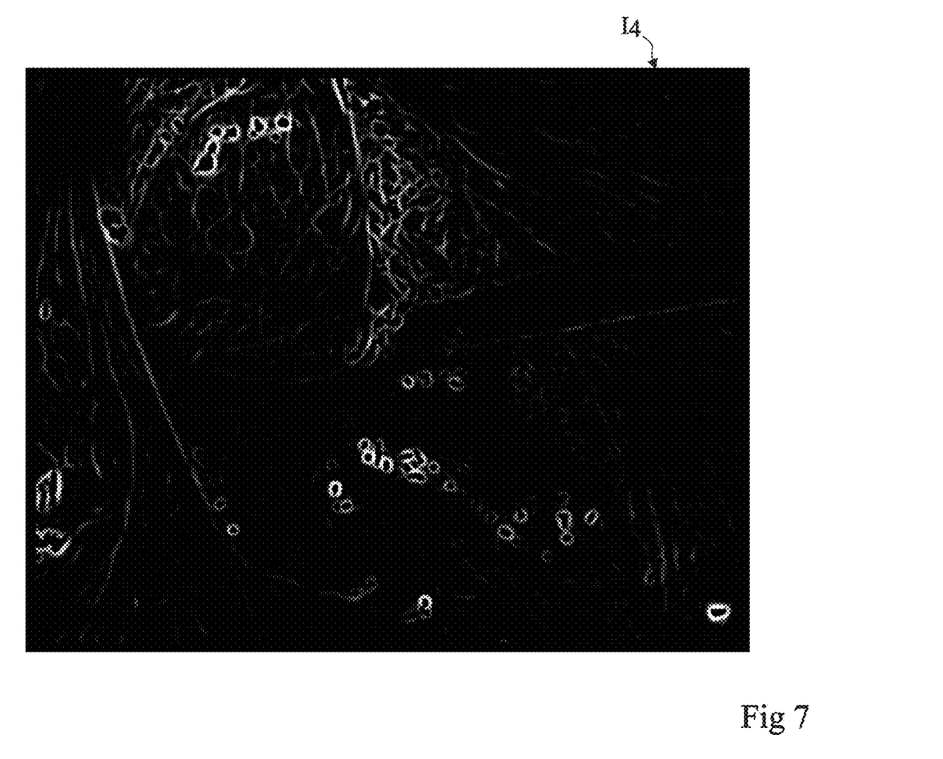

The method further comprises a step S6 which may be carried out independently from and in parallel with previously-described steps S2 to S5. At step S6, processing unit 28 determines a new image $I_4$ by applying to image $I_1$ a processing which enhances the contours of the elements present in image $I_1$, and particularly the contours of the surgical tools. According to an embodiment, the processing implements the Frangi algorithm. The Frangi algorithm is particularly described in Frangi et al.'s publication entitled "Multiscale vessel enhancement filtering" MICCAI'98 Lecture Notes in Computer Science, vol. 1496, PP. 130-137. Conventionally, the Frangi algorithm is used to more clearly show tubular elements in an image, and particularly blood vessels. The Frangi algorithm is not conventionally used for contour detection. The Frangi algorithm uses a search parameter which is representative of the number of pixels of the image corresponding to the apparent diameter of the tubular structures searched for in the image. Surprisingly, the inventors have shown that by using the Frangi algorithm with a search parameter corresponding to less than 10 pixels, preferably less than 5 pixels, particularly approximately 2 pixels, that is, to a value smaller than those conventionally used and smaller than the apparent diameter of the surgical tools in image $I_4$, the contours of the elements of image $I_3$ appear more clearly in image $I_4$. FIG. 7 shows an example of an image $I_4$ obtained from image $I_1$ after the implementation of step S6. This advantageously enables to implement the Frangi algorithm while it could not have been used to directly search for the surgical tools in image $I_1$. Indeed, according to the relative position between the surgical tool and camera 17, the apparent diameter of the surgical tool in the image may vary and is not previously known, so that the search parameters of the Frangi algorithm (in its conventional use) would not enable to uniquely isolate the instrument. Further, according to the viewing angle of camera 17, the surgical tool may have in image $I_1$ a more or less frustoconical shape, different from a tubular shape, and thus poorly adapted to a direct detection by the Frangi algorithm. The method carries on at step S7.

At step S7, unit 28 searches, for each window $F_S$ selected at step S5, for the edges $D_1$, $D_2$ of a possible surgical tool in the portion of image $I_4$ determined at step S6 contained within the selected window $F_S$. The detection method is based on the fact that each surgical tool has a shape which is known in advance, and which is generally at least partly cylindrical or frustoconical. In the case, the edges of the surgical tool in image $I_4$ have a rectilinear shape. According to an embodiment, each selected window $F_S$ is divided, along the major axis of symmetry of the window, into a first sub-region and a second sub-region. When a surgical tool is present in the portion of image $I_4$ contained in window $F_S$, each sub-window should contain a single edge of the surgical tool.

Figure 8:
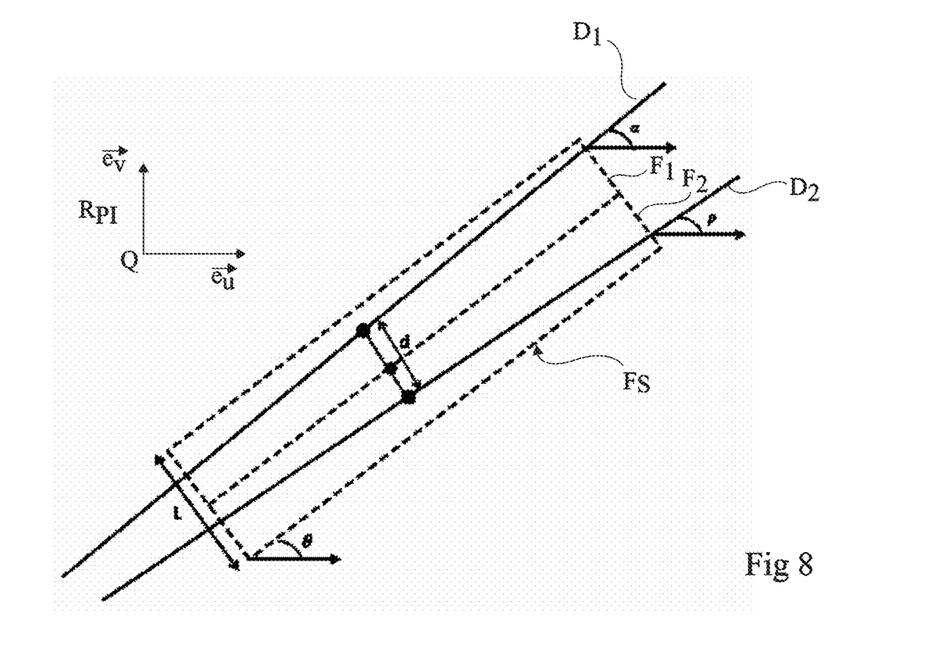
FIG. 8 illustrates an embodiment of a method of determining the edges of a surgical tool in an image.

FIG. 8 schematically shows a window $F_S$ divided into two sub-windows $F_1$ and $F_2$. Angle θ corresponds to the orientation of window $F_S$, that is, to the angle between the large side of window $F_S$ and a preferred direction, for example, axis (Q, $\vec{e_u}$) of reference frame $R_{PI}$. The width of the small side of window $F_S$ is noted L.

Processing unit 28 implements a method of shape recognition in each sub-window $F_1$ and $F_2$. When the surgical tool has a cylindrical or frustoconical shape, processing unit 28 implements a line recognition method in each sub-window $F_1$ and $F_2$. According to an embodiment, processing unit 28 implements the Hough transformation for example described in the work entitled "Use of the Hough Transformation To Detect Lines and Curves in Pictures" of Richard O. Duda and Peter E. Hart, Communications of the ACM, Vol. 15(1), pp. 11-15, 1972. The Hough transformation provides, for each sub-window $F_1$ and $F_2$, a plurality of candidate lines classified from the best candidate to the worst candidate.

Processing unit 28 selects the candidate lines supplied by the Hough transformation for sub-window $F_1$. Each candidate line of sub-window $F_1$ is defined by an angle α which is the angle between the candidate line of sub-window $F_1$ and the preferred direction. The processing unit compares angle α of the candidate lines with angle θ. According to an embodiment, edge $D_1$ of the surgical tool in sub-window $F_1$ corresponds to the candidate line having the best rank and having its angle α verifying the following relation (1):

$$\theta - 10 < \alpha < \theta + 10 \quad (1)$$

Processing unit 28 then selects the candidate lines supplied by the Hough transformation for sub-window $F_2$. Each candidate line of sub-window $F_2$ is defined by an angle ρ which is the angle between the candidate line of sub-window $F_2$ and the preferred direction and by the average distance d with edge $D_1$ of sub-window $F_1$. The processing unit compares angle ρ of the candidate lines with angle θ and compares distance d with width L, expressed in numbers of pixels. According to an embodiment, edge $D_2$ of the surgical tool in sub-window $F_2$ corresponds to the candidate line having the best rank verifying the following relation (2):

$$\theta - 10 < \rho < \theta + 10$$
$$L/2 < d < L + 10 \quad (2)$$

If the candidate lines provided by the Hough transformation do not fulfill the criteria used to determine edges $D_1$ and/or $D_2$, this means that the selected window contains no surgical tool. If the candidate lines supplied by the Hough transformation enable to determine edges $D_1$ and $D_2$, processing unit 28 concludes that a surgical tool is present in the selected window. The selected windows $F_S$ where surgical tools are detected are called instrument windows $F_I$. For each detected surgical tool, processing unit 28 stores data such as the position and the orientation of the corresponding instrument window $F_I$ and the two edges $D_1$, $D_2$ of the surgical tool. As previously described, the position and the orientation of each instrument window $F_I$ may be used by unit 28 at step S5 on processing of the next image acquired by camera 17. The method carries on at step S8.

At step S8, processing unit 28 determines the rotational axis of symmetry $A_{3D}$, also called central axis, of each surgical tool in reference frame $R_C$. For certain applications, it may be useful to determine the rotational axis of symmetry $A_{3D}$ in reference frame $R_O$. In this case, before the surgical operation, a step of calibrating positioning system 10 which comprises determining the transition matrix enabling to obtain coordinates (l, m, n) of a point P expressed in reference frame $R_C$ from coordinates (X, Y, Z) expressed in reference frame $R_O$ and the relation between the displacement orders provided by processing unit 28 to control unit 30 and the variation of parameters r, θ, and φ, is provided. During the surgical operation, processing unit 28 is then capable of determining at any time the position of reference frame $R_C$ relative to reference frame $R_O$ based on the displacement orders supplied to control box 30. It should be clear that reference frames $R_O$ and $R_C$ may be defined differently from what has been previously described. The only condition is that reference frame $R_O$ can be considered as being fixed with respect to the patient during the operation, that reference frame $R_C$ can be considered as being fixed with respect to the camera during the operation and that the position of reference frame $R_C$ with respect to reference frame $R_O$ can be determined at any time.

Figure 9:
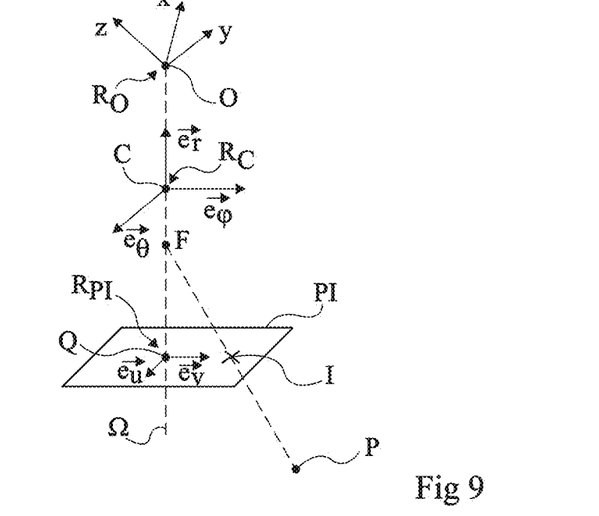
FIG. 9 illustrates the relation between the position of a point in space and the projection of this point on the image plane of a camera.

In FIG. 9, reference frames $R_O$ and $R_C$ have been schematically shown with their origins located on optical axis Ω of endoscope 12. According to an embodiment, it is considered that camera 17 operates according to a pinhole camera model. Such a camera model is for example described in "Three Dimensional Computer Vision—A Geometric Viewpoint" of Olivier Faugeras, series: Artificial Intelligence, the MIT press, Cambridge Massachussets, ISBN 0-262-06158-9 (chapter 3). Camera 17 can then be represented by a projection center F and image plane PI. Image plane PI corresponds to the plane where the images captured by camera 17 and transmitted to acquisition system 20 are formed. Image plane PI and projection center F are fixed with respect to reference frame $R_C$. Any point P in space projects in image plane PI to form a point I. The two-dimensional reference frame $R_{PI}$ (Q, $\vec{e_u}$, $\vec{e_v}$) associated with image PI has further been shown. As a variation, another camera model than the pinhole model may be used, for example, a fisheye camera model. Generally, any camera model which specifies the transformation associating with each point P in space the corresponding point I in image plane PI may be used.

Before the surgical operation, a step of calibrating camera 17 is provided. This comprises defining the transition matrix which provides the coordinates (u, v) of point I expressed in reference frame $R_{PI}$ from the coordinates (l, m, n) of point P expressed in reference frame $R_C$. According to the pinhole model, point I corresponds to the point of intersection between image plane PI and the straight line running through point P and projection center F. The transition matrix is obtained from the coordinates of point F and the equation of image PI expressed in reference frame $R_C$ and which depend on the technical features of the camera 17 used. Other camera models may be used. As a variation, the step of calibrating camera 17 may be carried out during the surgical operation by a so-called "on-line" calibration method based on the analysis of the images acquired by camera 17 during the surgical operation.

After the steps of calibrating positioning system 10 and camera 17, processing unit 28 can determine, for any point P of coordinates (X, Y, Z) in fixed reference frame RO, the coordinates (u, v) of point I, the projection of point P in image plane PI, whatever the position of camera 17 in reference frame RO.

Figure 10:
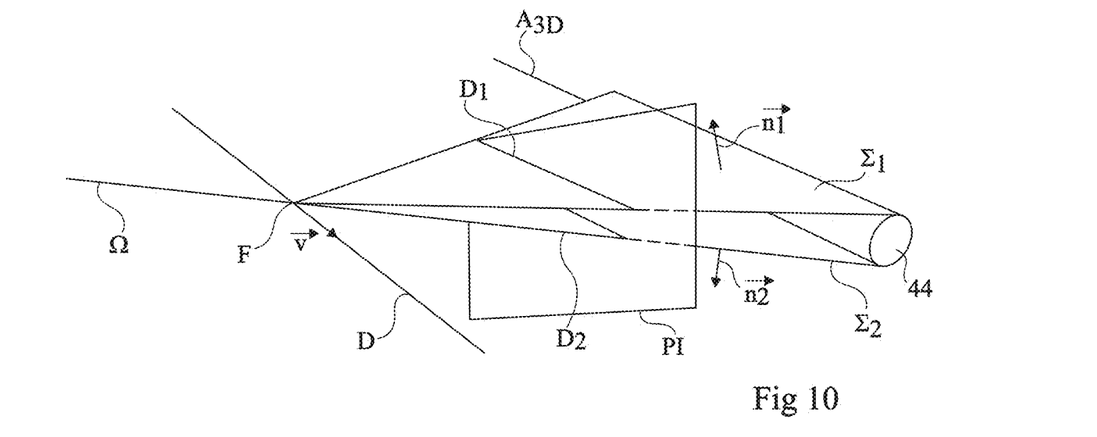
FIGS. 10 and 11 illustrate an embodiment of a method of determining the central axis of a surgical tool.

In FIG. 10, surgical tool 44, projection center F, optical axis Ω, and image plane PI of camera 17 have been schematically shown. In image plane PI, the edges $D_1$, $D_2$ of the surgical tool determined at step S7 have been shown.

To determine, for each surgical tool, the equation of central axis $A_{3D}$ of the tool in reference frame $R_C$, processing unit 28 determines the equation in reference frame $R_C$ of plane $\Sigma_1$ running through edge $D_1$ and projection center F and the equation in reference frame $R_C$ of plane $\Sigma_2$ running through edge $D_2$ and projection center F. Call $\vec{n}_1$ the vector normal to plane $\Sigma_1$ and $\vec{n}_2$ the vector normal to plane $\Sigma_2$. Surgical tool 44 having a cylindrical shape, planes $\Sigma_1$ and $\Sigma_2$ are tangent to tool 44. The intersection of planes $\Sigma_1$ and $\Sigma_2$ is a straight line D having director vector $\vec{v}$ and running through projection center F. Line D is parallel to central axis $A_{3D}$. To fully define the position of central axis $A_{3D}$ in reference frame $R_C$, it is necessary to determine the position of a passage point M in reference frame $R_C$ belonging to central axis $A_{3D}$.

An embodiment of a method of determining the position of central axis $A_{3D}$ is described in paragraph 3.2.3 of Rémi Wolf's thesis entitled "Quantification de la qualité d'un geste chirurgical à partir de connaissances a priori" (Doctoral thesis, Grenoble University, 2013).

Figure 11:
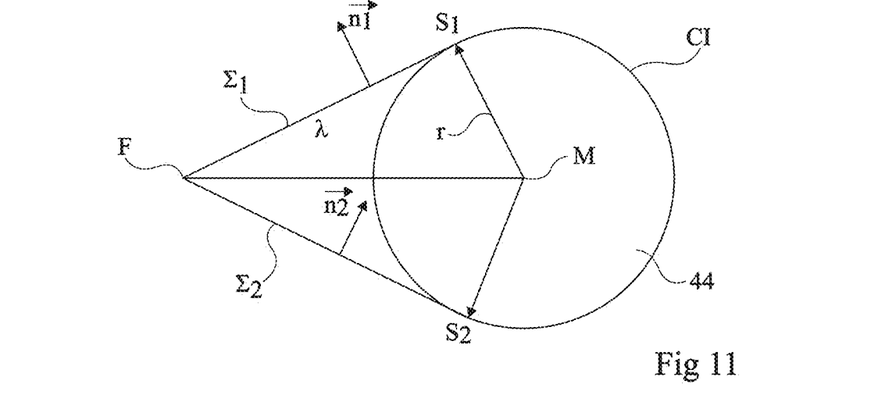

FIG. 11 is a cross-section view of surgical tool 40 in a plane perpendicular to vectors $\vec{n}_1$ and $\vec{n}_2$. In this cross-section plane, tool 44 corresponds to a circle CI tangent to planes $\Sigma_1$ and $\Sigma_2$ and having a known radius r. The unit can then determine the position in reference frame $R_C$ of the center of circle CI which corresponds to passage point M. Central axis $A_{3D}$ is defined by passage point M and director vector $\vec{v}$. Processing unit 28 then determines projection $A_{2D}$ of central axis $A_{3D}$ in image plane PI of camera 17. The obtained line $A_{2D}$ corresponds to the central axis of the surgical tool expressed in reference frame $R_{PI}$.

According to another embodiment, at step S8, for each surgical tool, axis $A_{2D}$ corresponds to the axis of symmetry of the edges of the surgical tool. It should be noted that the axis $A_{2D}$ thus determined does not correspond, except in specific cases, to the projection of central axis $A_{3D}$ in image plane PI of the camera since the central projection does not keep the proportions between distances.

At step S9, processing unit 28 determines, for each surgical tool 44, 45, the position in reference frame $R_C$ of a point $P_{I3D}$, called insertion point, located substantially at the "center" of incision 42, 43 having the surgical tool passing therethrough. For this purpose, processing unit 28 uses the positions of central axis $A_{3D}$ in reference frame $R_C$ determined at step S8 for at least two different orientations of the surgical tool. Insertion point $P_{I3D}$ corresponds to the point of intersection of the lines which correspond to the different positions of axis $A_{3D}$ thus determined. Preferably, the position of the insertion point is obtained from more than two different orientations of the surgical tool. The insertion points $P_{I3D}$ of the surgical tools may be used at step S5 on selection of windows $F_S$, where a window can only be selected if the great axis of symmetry of the window runs close to one of the insertion points. As a variation, the insertion points $P_{I3D}$ of the surgical tools may be used at steps S7 and S8 for the detection of edges $D_1$, $D_2$. The detection of edges $D_1$, $D_2$ is for example considered as wrong if the distance between the associated insertion point $P_{I3D}$ and central axis $A_{3D}$ of the surgical tool is greater than a threshold. According to another embodiment, step S9 is not present.

The method further comprises a step S10 of determining, for each surgical tool, position $P_{P2D}$ of the tip of the surgical tool in reference frame $R_{PI}$ of image plane PI of camera 17 based on the filtered image $I_4$ determined at step S6 and on projection $A_{2D}$ of central axis $A_{3D}$ in image plane PI determined at step S8. According to an embodiment, processing unit 28 searches, among the pixels of axis $A_{2D}$, for a group of successive pixels, for example comprising at least three successive pixels, having a maximum grey level. The tip of the surgical tool corresponds to the pixel group thus determined. To decrease determination errors, it is possible to only carry out the pixel group search on the portions of axis $A_{2D}$ close, for example, by more or less than 100 pixels, to the sides of the selected window $F_S$, determined at step S5, and containing the surgical tool of axis $A_{2D}$. According to another embodiment, processing unit 28 implements a pixel selection method based on Otsu's method. It may be necessary, to more finely determine the position of the tip of the tool, to consider in further detail the pixels of the central axis around the tip of the tool and to apply thereto color constraints to determine whether they effectively belong or not to the tool. At the end of the surgical tool detection method, processing unit 28 has thus determined for each surgical tool the central axis, the edges, and the tip. The method carries on at step S11.

At step S11, unit 28 determines, for each surgical tool, the penetration depth E of the surgical tool with respect to the associated passage point M based on position $P_{P2D}$ of the tip of the surgical tool in reference frame $R_{PI}$ determined at step S10, on the position of passage point M in reference frame $R_C$, and on the director vector $\vec{v}$ of central axis $A_{3D}$. Processing unit 28 can then determine, for each surgical tool, position $P_{P3D}$ of the tip of the surgical tool in reference frame $R_C$ based on the position of passage point M, on penetration E, and on director vector $\vec{v}$ according to the following relation (3):

$$P_{P3D} = M + E * \vec{v} \qquad (3)$$

According to another embodiment, vector $\vec{u}$ which runs through center C of the camera and through point $P_{P2D}$ of image $I_4$, expressed in reference frame $R_C$, is determined from the calibration parameters of camera 17. The intersection between the line running through point C and having vector $\vec{u}$ as a director vector and the line running through passage point M and having vector $\vec{v}$ as a director vector is then determined.

The present invention allows the implementation of complex displacement orders by processing unit 28 for the displacement of positioning system 10 of camera 17. As an example, processing unit 28 may control positioning system 10 to displace endoscope 12 until the tip of a surgical tool is located at the center of the image provided by camera 17. For this purpose, the surgeon may issue an order of "center on identifier" type to processing unit 28 via voice control system 38. Processing unit 28 can then detect the tools present in the image supplied by camera 17. If the tip of the tool corresponding to the identifier supplied by the surgeon is present in the image, processing unit 28 then controls positioning system 10 to displace endoscope 12 so that the tip of the tool is at the level of a predefined central region of the image. If the tool correspond to the identifier provided by the surgeon is present in the image but the tip of the tool is located outside of the image, processing unit 28 is capable of controlling positioning system 10 to displace endoscope 12 towards the tip of the tool since the position of the insertion point associated with the tool is known. If the tool corresponding to the identifier provided by the surgeon is not present in the image, processing unit 28 may control positioning system 10 to direct endoscope 12 towards the insertion point associated with the desired tool. The tool should then be located in the image supplied by camera 17 and the centering on the tip of the tool is performed as previously described.

Another example of control comprises displacing endoscope 12 so that the tip of a surgical tool is permanently at the level of the central region of the image supplied by camera 17. To achieve this, the surgeon may issue an order of "follow identifier" type to processing unit 28 via voice control system 38. Processing unit 28 then controls positioning system 10 as previously described to center the image supplied by camera 17 on the tip of the tool corresponding to the identifier provided by the surgeon. Afterwards, for each new image received by processing unit 28, unit 28 controls positioning system 10 to center back, if necessary, the image on the tip of the tool.

Another example of control comprises controlling a "magnification" of the image at the level of the tip of a specific tool. For this purpose, the surgeon may issue an order of "zoom on identifier" type to processing unit 28 via voice control system 38. Processing unit 28 then controls positioning system 10 as previously described to center the image supplied by camera 17 on the tip of the tool corresponding to the identifier provided by the surgeon. Processing unit 28 can then determine the distance between the lines of edges associated with the considered tool at the level of the tip of the tool and deduce therefrom a value representative of the image magnification. Processing unit 28 may then control positioning system 10 to displace endoscope 12 to increase or to decrease such a magnification to achieve a predetermined magnification or a magnification provided by the surgeon. According to a variation, camera 17 may comprise a magnification function (zoom). Processing unit 28 is then capable of controlling the magnification function of camera 17 based on the detection of the distance between lines.

The duration of the processing of an image by processing unit 28 may vary from a few tens of milliseconds to some hundred milliseconds. Processing unit 28 can thus receive new images to be processed at a high frequency. The surgical tool detection method according to the invention can thus be implemented in real time.

The present invention thus enables, during a surgical operation, to relieve the surgeon who does not have to systematically control each displacement of endoscope 12. Indeed, the previously described orders enable the surgeon to be fully dedicated to the surgical operation, processing unit 28 automatically controlling in parallel the displacements of endoscope 12 according to the initial order issued by the surgeon.

The present invention may also be implemented when the surgical tools do not have a cylindrical shape. The previous embodiment may be directly applied to a tool having an elongated shape and having its projection in a plane comprising rectilinear edges. This applies for a conical, prismatic, pyramidal, etc. shape. More generally, even for tools having more complex shapes, geometric parameters characteristic of the tools may be stored in processing unit 28. The steps of the previously-described tool detection method can then be adapted according to the geometric parameters characteristic of each surgical tool.

The previously-described detection method enables to detect the position of the surgical tool, more particularly to determine the central axis $A_{3D}$ of a surgical tool, in reference frame $R_C$. According to an embodiment, the surgical tool may be carried by a robot. The position of the surgical tool relative to a reference frame $R_R$ connected to the robot is generally known. Processing unit 28 can thus determine the relation of transition between reference frames $R_O$ and $R_R$. Advantageously, it is then not necessary to provide a system of mechanical connection between the robot carrying the surgical tool and positioning system 10 of camera 17. The robot carrying the surgical tool can thus be separated from the positioning system of camera 17. Further, even in the case where the robot carrying the surgical tool is mechanically connected to positioning system 10 of camera 17, the geometric model of the robot, from which the position of the surgical tool can be expressed in reference frame $R_C$, may be inaccurate. The detection of the position of the surgical tool in reference frame $R_C$ may then advantageously enable to at least partly compensate for the inaccuracy of the geometrical model of the robot. As an example, in the case of a robot comprising a plurality of arms, one for example carrying an endoscope and others carrying surgical tools, the detection of the position of the surgical tool in reference frame $R_C$ may enable to improve the calibration of the arms with respect to one another.

According to another embodiment, the detection of the position of the surgical tool in reference frame $R_C$, and possibly in reference frame $R_O$, may be used to record the movements of the surgical tool steered by the surgeon during the operation, particularly for training purposes or for the analysis of the surgical gesture.

Of course, the present invention is likely to have various alterations and modifications which will occur to those skilled in the art. In particular, although the present invention has been described for surgical operations, for which the video images are provided by a camera connected to an endoscope, the present invention may apply to any type of image supplied by a medical imaging system. These are, for example, ultrasound images, fluoroscopic images, or scanner images. Further, although the present invention has been described for a specific example of a positioning system, it may apply to any type of positioning system.

What is claimed is:

1. A method of detecting a surgical tool in, a first image comprising the steps of:
   storing shape parameters of the surgical tool;
   determining a second image containing distinct pixel regions from the first image by a first processing comprising segmenting the first image;
   determining first windows, each first window surrounding one of the regions;
   selecting at least one second window from among the first windows based on the shape parameters;
   determining a third image from the first image by applying to the first image a second processing implementing the Frangi algorithm; and
   determining lateral edges of the surgical tool in the portion of the third image contained in said second window.

2. The method of claim 1, wherein the surgical tool has an elongated shape, the lateral edges of the surgical tool in the third image corresponding to straight lines.

3. The method of claim 2, wherein candidate straight lines classified according to a ranking order are determined by applying a Hough transform in the portion of the third image contained in the second window and wherein the lateral edges are determined, among the candidate straight lines based on the shape parameters.

4. The method of claim 3, wherein the second window is rectangular and divided into a first sub-window and a second sub-window, wherein a first lateral edge corresponds to the candidate straight line having the best rank in the first sub-window and having an inclination with respect to the major axis of symmetry of the second window smaller than a first threshold, and wherein a second lateral edge corresponds to the candidate straight line having the best rank in the second sub-window, having an inclination with respect to the major axis of symmetry of the second window smaller than the first threshold, and having its distance to the first lateral edge in the range from a second threshold to a third threshold which depend on the width of the second window.

5. The method of claim 1, wherein the first processing comprises binarizing the first image and determining the second image based on the determination of a distance map of the binarized image.

6. The method of claim 1, wherein the second processing comprises applying the Frangi algorithm to the first image with a search parameter, representative of the number of pixels of the apparent diameter of tubular structures searched for by the Frangi algorithm, smaller than 10 pixels.

7. The method of claim 1, wherein the first image is an image in grey levels obtained from component 'a' or 'b' of a fourth image acquired by a camera and coded in the CIE Lab color space.

8. The method of claim 1, wherein the first windows are rectangular and wherein the second window is selected by only retaining the first windows having a length greater than half their width.

9. The method of claim 1, wherein the first image is obtained from a fourth image acquired by a camera, the method further comprising the steps of:
   determining projection planes containing the lateral edges and a projection center of the camera to provide two projection planes; and
   determining the position of a central axis of the surgical tool based on the intersection of the two projection planes, on the shape parameters, and on a point belonging to the central axis.

10. The method of claim 9, further comprising the steps of:
    determining a projection of the central axis in the third image;
    determining the pixels of the projection of the central axis belonging to the surgical tool; and
    determining the pixel of the projection of the central axis corresponding to the end of the tool.

11. The method of claim 10, comprising the steps of:
    assigning to each pixel of the third image of the projection of the central axis a color class from among a first or a second color class;
    selecting a first, group of adjacent pixels containing the largest number of adjacent pixels of the first color class and a second group of adjacent pixels containing the largest number of adjacent pixels of the second color class; and
    selecting, from among the first or the second group of pixels, the pixel group belonging, to the surgical tool.

12. A device for selecting a surgical tool in a first image $(I_t)$, comprising:
    means for storing shape parameters of the surgical tool;
    means for determining a second image containing distinct pixel regions based on the first image by a first processing comprising segmenting the first image;
    means for determining first windows, each window surrounding one of the regions;
    means for selecting at least one second window from among the first windows based on the shape parameters;
    means for determining a third image based on the first image by a second processing enhancing the contours of the surgical tool in the first image; and
    means for determining lateral edges of the surgical tool on the portion of the third image contained in said second window.

* * * * *